(12) United States Patent
Martin

(10) Patent No.: US 11,474,238 B2
(45) Date of Patent: Oct. 18, 2022

(54) METHOD FOR IMPROVING PERFORMANCE OF A SODAR SYSTEM

(71) Applicant: ELECTRO MAGNETIC MEASUREMENTS PTY LTD, Ferny Creek (AU)

(72) Inventor: Andrew Louis Martin, Ferny Creek (AU)

(73) Assignee: ELECTRO MAGNETIC MEASUREMENTS PTY LTD, Victoria (AU)

( * ) Notice: Subject to any disclaimer, the term of this patent is extended or adjusted under 35 U.S.C. 154(b) by 0 days.

(21) Appl. No.: 17/288,244

(22) PCT Filed: Oct. 22, 2019

(86) PCT No.: PCT/AU2019/051149
§ 371 (c)(1),
(2) Date: Apr. 23, 2021

(87) PCT Pub. No.: WO2020/082116
PCT Pub. Date: Apr. 30, 2020

(65) Prior Publication Data
US 2021/0389457 A1 Dec. 16, 2021

(30) Foreign Application Priority Data
Oct. 25, 2018 (AU) .............................. 2018904050

(51) Int. Cl.
*G01S 15/88* (2006.01)
*G01P 5/02* (2006.01)
(Continued)

(52) U.S. Cl.
CPC .............. *G01S 15/885* (2013.01); *G01P 5/02* (2013.01); *G01P 5/244* (2013.01); *G01S 7/526* (2013.01)

(58) Field of Classification Search
CPC .......... G01S 15/885; G01S 7/526; G01P 5/02; G01P 5/244
(Continued)

(56) References Cited

U.S. PATENT DOCUMENTS 8,264,908 B2 * 9/2012 Walls .................... G01S 15/885
367/90
2005/0232082 A1 * 10/2005 Martin .................... G01N 29/46
367/129
(Continued)

FOREIGN PATENT DOCUMENTS

WO         2006135955 A1    12/2006
WO    WO-2006135955 A1 *  12/2006 ........... G01S 15/104
(Continued)

OTHER PUBLICATIONS

Diaz, et al.; "Remote sending of wind", "Remote sending for wind energy" Riso National Laboratory for Sustainable Energy; Technical University of Denmark; May 2011.
Bradley, et al.; "Corrections to sodar Doppler winds due to wind drift"; Meteorolishce Zeitschrift; 2014.
Behrens, et al.; "A multisodar approach to wind profiling"; Journal of Atmospheric and Oceanic Technology, Jul. 2010.

*Primary Examiner* — Nathaniel T Woodward
(74) *Attorney, Agent, or Firm* — Dickinson Wright PLLC; Andrew D. Dorisio

(57) ABSTRACT

This invention relates to a method of improving performance of a SODAR system adapted to locate discontinuities in the atmosphere by transmitting pulse compression signals such as a plurality of acoustic chirps, the method comprising: transmitting one or more acoustic chirps; receiving one or more acoustic echoes of the transmitted chirps; processing the acoustic echoes to provide an indication of the discontinuities in the atmosphere, thereby providing a wind shear profile; processing the wind shear profile to correct (Continued)

systematic Doppler errors associated with the acoustic echoes by: subtracting a first measured wind speed from the wind shear profile; and adding a second measured wind speed to the wind shear profile.

13 Claims, 8 Drawing Sheets

(51) Int. Cl.
*G01P 5/24* (2006.01)
*G01S 7/526* (2006.01)

(58) Field of Classification Search
USPC .................................................. 73/861.25
See application file for complete search history.

(56) References Cited

U.S. PATENT DOCUMENTS

2006/0162440 A1* 7/2006 Martin ..................... G01P 5/24
73/170.13
2011/0267223 A1* 11/2011 Jin ........................ G01S 7/2923
342/137

FOREIGN PATENT DOCUMENTS

WO 2014053013 A1 4/2014
WO WO-2014053013 A1 * 4/2014 ............. G01S 15/34

* cited by examiner

METHOD FOR IMPROVING PERFORMANCE OF A SODAR SYSTEM

This application claims priority from Australian Provisional Patent Application No. 2018904050 filed on 25 Oct. 2018, the contents of which are to be taken as incorporated herein by this reference.

TECHNICAL FIELD

The present invention relates to the field of SODAR systems for use in atmospheric sounding and in particular relates to a method of correcting systematic Doppler errors observed in SODAR systems.

BACKGROUND OF INVENTION

SODAR systems use pulse compression of acoustic signals (preferably acoustic chirps) that have relatively wide bandwidth (when compared to conventional short pulse SODAR systems) to obtain vertical wind speed and direction as well as large and small scale turbulence.

Use of relatively wideband acoustic chirps in SODAR systems (to realize full advantages of pulse compression) provides many potential advantages over conventional short pulse single frequency systems including increased gain and better resolution but also introduces several problems including problems associated with systematic Doppler errors in measurements used to obtain the wind speed and direction, which may be introduced into the wind speed and direction measurements from direct signal interference.

A pulse compression by linear frequency modulation (or chirp) based SODAR system is the subject of Applicant's U.S. Pat. No. 6,755,080 entitled Acoustic Sounding. The invention disclosed in that patent involves an acoustic sounding system wherein the component tones in a transmitted chirp are mixed, differenced, correlated or otherwise compared with the component tones in an echo chirp resulting from the reflection, refraction and/or scattering of the transmitted chirp. In this way, chirp transit times (and therefore the location of reflecting or refracting discontinuities in height) can be indicated as a frequency difference between the transmitted and the received chirps at any given instant. Furthermore, phase variation in an echo tone can be detected and displayed to indicate variation in velocity of the reflecting or refracting discontinuity with respect to the transmitter and/or receiver to ultimately derive a wind shear profile representative of wind speed and direction measurements. The transmitted acoustic chirp can be generated by feeding a loudspeaker with an electrical input signal from a signal generator (for example), while the echo chirp can be detected using a microphone that generates an electrical echo signal.

Generally, the same methods may be employed by the present invention with the addition of a method to correct the systematic Doppler errors. Systematic Doppler errors relate to wind speed height (range) errors where the wind speed measured at a given height is displaced to a greater or lesser height, resulting in resolution and wind speed height errors.

It would be desirable to provide a method which ameliorates or at least alleviates systematic Doppler errors in measurements used to obtain the wind speed and direction in SODAR systems.

A reference herein to a patent document or other matter which is given as prior art is not to be taken as an admission that that document or matter was known or that the information it contains was part of the common general knowledge as at the priority date of any of the claims.

SUMMARY OF INVENTION

According to an aspect of the present invention, there is provided a method of improving performance of a SODAR system adapted to locate discontinuities in the atmosphere by transmitting pulse compression signals such as a plurality of acoustic chirps, the method comprising: transmitting one or more acoustic chirps; receiving one or more acoustic echoes of the transmitted chirps; processing the acoustic echoes to provide an indication of the discontinuities in the atmosphere, thereby providing a wind shear profile; processing the wind shear profile to correct systematic Doppler errors associated with the acoustic echoes by: subtracting a first measured wind speed from the wind shear profile; and adding a second measured wind speed to the wind shear profile.

In one or more embodiments, the first measured wind speed is measured by the SODAR system.

In one or more embodiments, the second measured wind speed is measured by an anemometer. Such a measurement can be made by using a guyed tower or the like. A cup anemometer and wind vane, or a vane with a propeller speed sensor mounted in front may be employed for the measurement.

In one or more embodiments, the first measured wind speed and second measured wind speed are taken at ground level.

In one or more embodiments, the first measured wind speed and second measured wind speed are taken at between 0 m (metres) and 15 m (metres) above ground level.

In one or more embodiments, the first measured wind speed is a scalar wind speed.

In one or more embodiments, the first measured wind speed is a vector wind speed.

In one or more embodiments, the second measured wind speed is a scalar wind speed.

In one or more embodiments, the second measured wind speed is a vector wind speed.

In one or more embodiments, processing the wind shear profile to correct systematic Doppler errors further comprises application of a correction factor to the wind shear profile to provide a corrected wind shear profile at a plurality of height segments.

In one or more embodiments, the correction factor is selected from a look-up table of correction factors associated with the plurality of height segments. Advantageously, applying the correction factor selected from a look-up table of correction factors can replace runtime computation of an algorithm with a simpler array indexing operation or the like. For example, a power series function can be substituted by a lookup table. The savings in terms of processing time can be significant, since retrieving a value from memory is often faster than undergoing an "expensive" computation or input and/or output operation (in SODAR applications time is often more critical than memory usage).

In one or more embodiments, correction factor is calculated using a correction algorithm.

In one or more embodiments, the algorithm provides a multiplying correction y to be applied at each of the plurality of height segments given by: $y = C \times h^a$ where h is the height in metres, C is a system dependent constant derived from calibration data and a is an exponential constant.

BRIEF DESCRIPTION OF DRAWINGS

The invention will now be described in further detail by reference to the accompanying drawings. It is to be under

DETAILED DESCRIPTION

Figure 1:
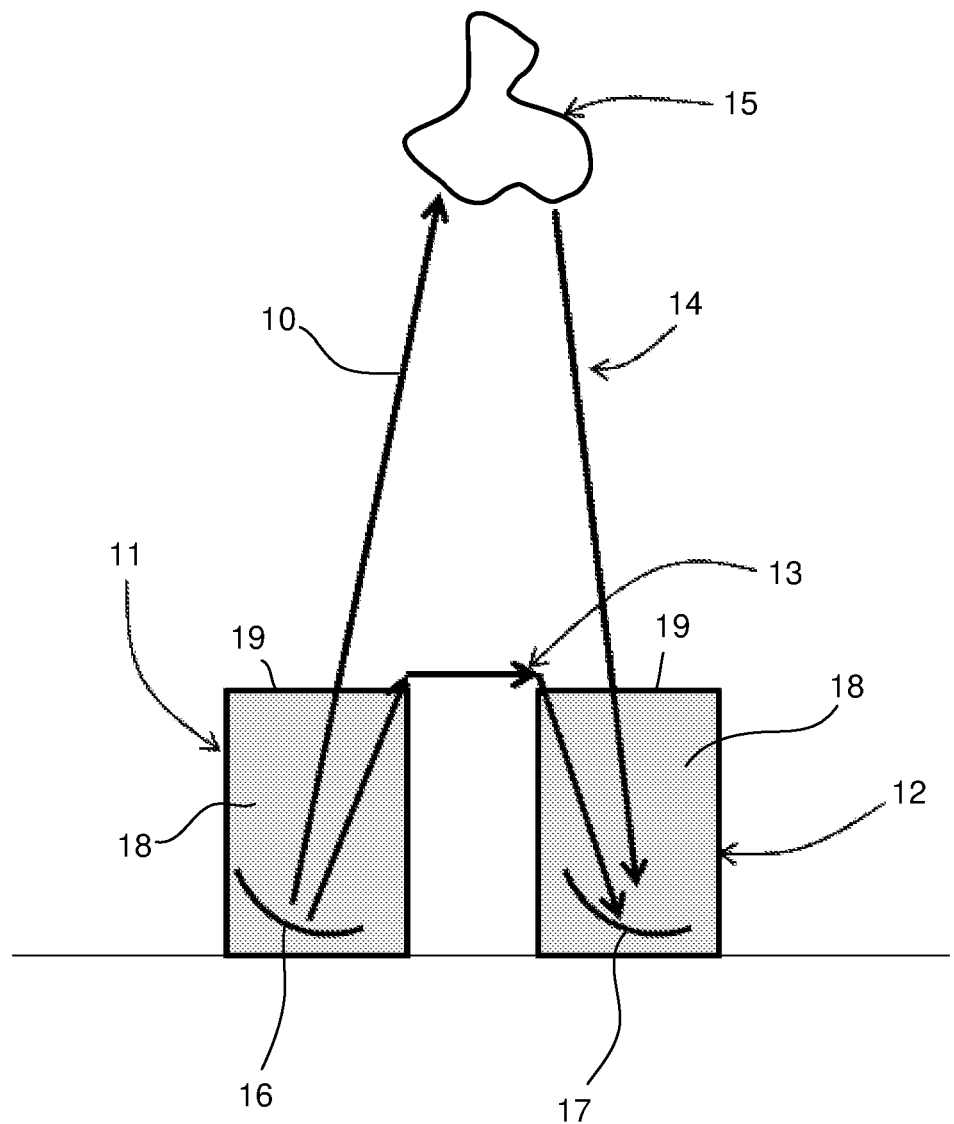
- FIG. 1 shows a pulse compression SODAR system that uses acoustic chirp signals suitable for locating discontinuities in the atmosphere.

FIG. 1 shows a pulse compression SODAR system 11 that uses acoustic chirp signals suitable for locating discontinuities in the atmosphere. The output of the SODAR system is shown in FIG. 2 for a selection of wind speeds.

Referring to FIG. 1, a chirp signal 10 comprising an audio signal that increases in frequency over time is generated and amplified before application to a loudspeaker (transmitting acoustic transducer) and reflector system 16 which directs acoustic energy upwards. The acoustic energy is reflected from discontinuities 15 in the atmosphere. The reflected signal 14 is received by a microphone (receiving acoustic transducer) and reflector system 17. The loudspeaker 16 and microphone 17 are each located within its own separate acoustic baffle 18 that is also open only at the top 19.

The loudspeaker 16 and acoustic baffle 18 are preferably arranged so that the acoustic output of the loudspeaker 16 is directed upwards. The microphone 17 and its acoustic baffle 18 may also be arranged so as to preferentially receive sounds travelling downwards. As shown, the loudspeaker 16 and microphone 17 may be angled slightly away from one another. Despite the use of acoustic baffles and the like, a direct signal 13 is received by microphone 17. The direct signal 13 is not subject to any Doppler effect from the wind or disturbances in the atmosphere, whereas the reflected signal 14 is subject to Doppler shift as the wind passes over the loudspeaker 16 and microphone 17. To that end, the direct signal 13 will not be identical with the transmitted chirp signal 10 because of the acoustic shielding provided by the baffles 18 employed around the loudspeaker 16 and microphone 17. The direct signal 13 can be subtracted from the reflected signal 14 using known DSP techniques but, if the overlap of the direct 13 and reflected signals 14 is not great for the reflected signals 14 of most interest, processing in the Fourier or frequency domain can effectively remove or discount most direct signals 14. If the direct signals are not removed, the resulting amplitude-time display will show early high-amplitude returns as shown with reference to FIG. 2.

Figure 2:
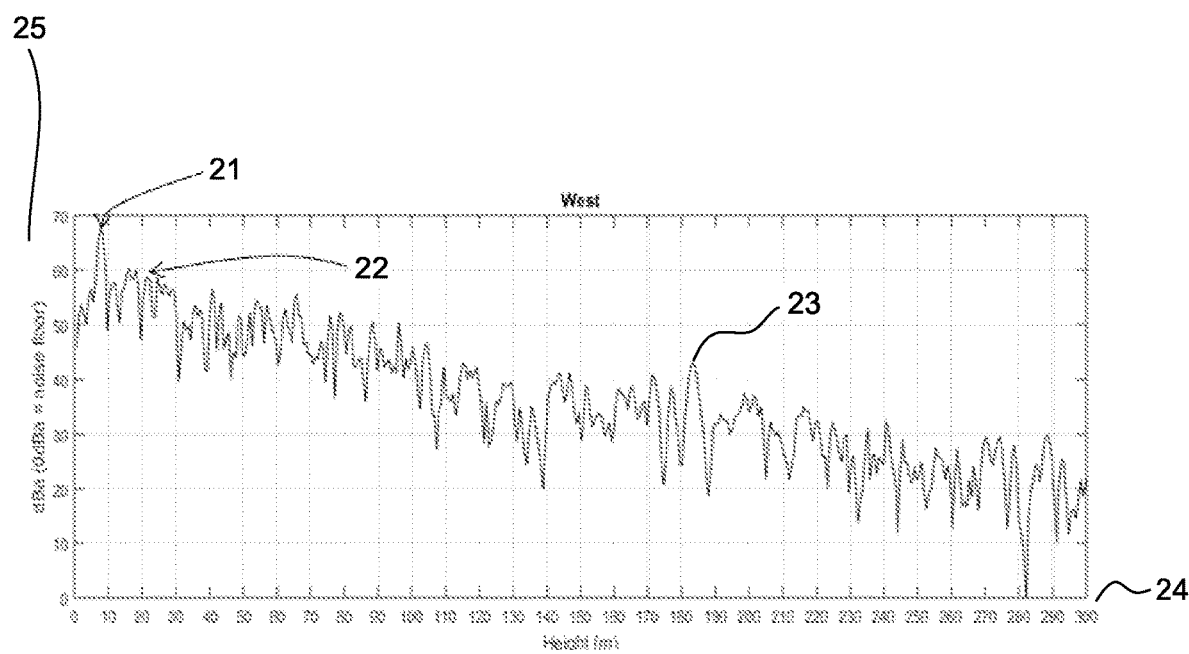
FIG. 2 shows an exemplary received signal up to a height of 300 m from a generic pulse compression SODAR system.

FIG. 2 shows an exemplary received signal measured in dBa up to a height of 300 m from a pulse compressions SODAR system.

Referring to FIG. 2, a direct signal amplitude 21 is shown at a height of 8 m, as defined by axis 24. The direct signal 21 is received at a level high enough to have an effect on the received signal 23 despite isolation techniques employed around the loudspeaker 16 and microphone 17, including acoustic baffles 18 and the like, as discussed with reference to FIG. 1. The direct signal 21 has no Doppler shift as it arrives across the top of the acoustic baffles. The direct signal 21 is thus constant and has no Doppler shift. In the exemplary received signal 23 shown, the transmit level is approximately 130 dBa while the received direct signal 21 level is approximately 68 dBa (an attenuation of 62 dB), as defined by axis 25. In spite of this high level of attenuation the direct signal 21 still has a significant effect when it is added to the received (atmospheric backscattered) signal 23 which is approximately 60 dBa at its maximum point 22.

Figure 3:
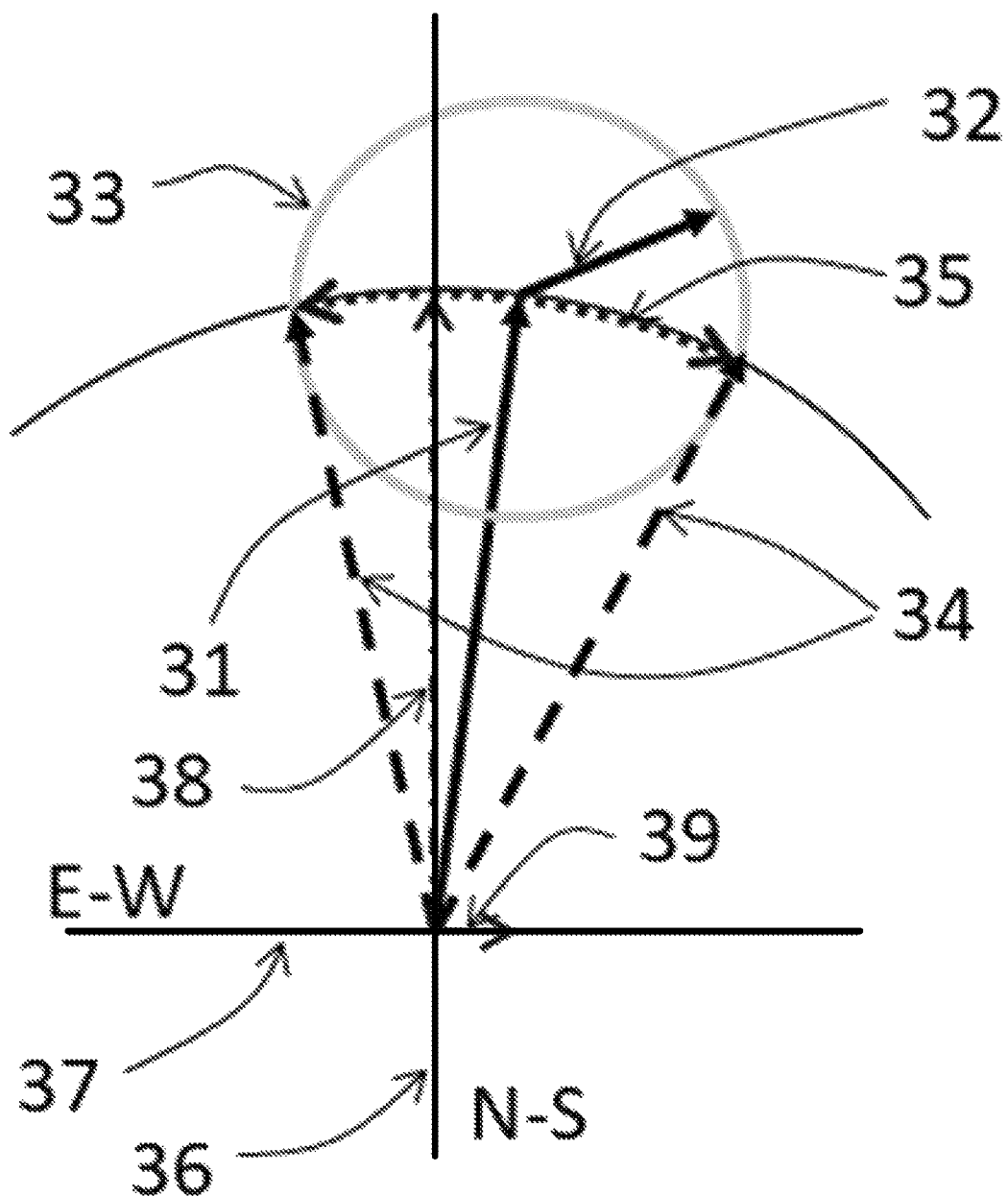
FIG. 3 shows a vector diagram of direct and atmospheric reflected signals from a generic pulse compression SODAR system.

FIG. 3 shows a vector diagram of direct and atmospheric reflected signals from a pulse compression SODAR system.

Referring to FIG. 3, a direct signal 38 measured from the North-South direction 36 and a direct signal 39 measured from the East-West direction 37 are combined into resultant direct signal 31. The resultant direct signal 31 is added to a smaller vector signal 32 backscattered by the atmosphere from the North-South and East-West directions and having a Doppler shift 33 associated with it (i.e., phase variation up to $2\pi$, thus the circle 33). The addition of the resultant direct signal 31 and the backscattered Doppler shifted signal 32 produces resultant vectors 34 that vary over a much smaller phase range 35, compared to the original Doppler phase shift range of the backscattered signal 33 (i.e., phase variation much less than $2\pi$).

Figure 4:
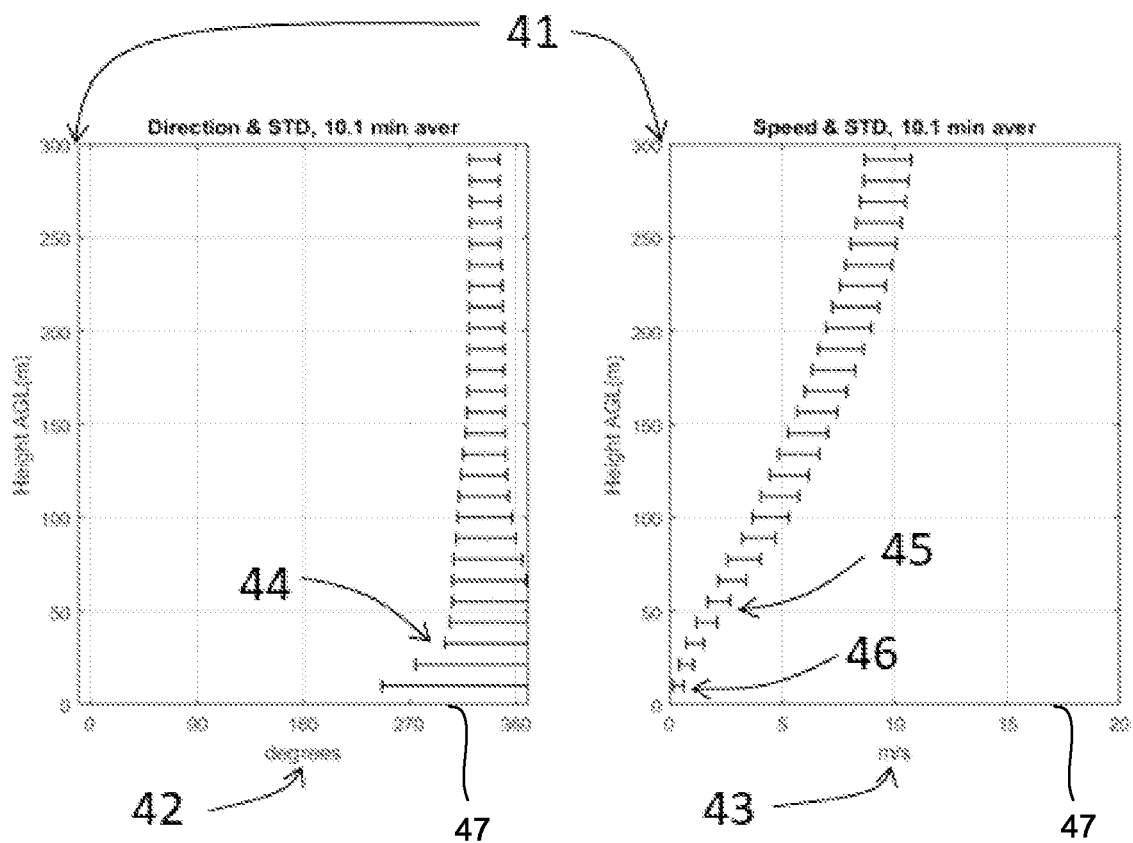
FIG. 4 shows an exemplary Doppler measured wind speed profile.

FIG. 4 shows an exemplary Doppler measured wind shear profile derived from the received signal, as discussed with reference to FIG. 2. The wind shear profile is derived by known methods. For example, the processing may include segmenting received phase information into several height ranges and then using the average wind within that range to calculate the frequency shifts due to Doppler within the range. The processing may also include a method of adding together or interpolating between each range segment over the height of the wind information to obtain a complete wind profile.

Referring to FIG. 4, a wind profile 41 up to a height of 300 m from a pulse compressions SODAR system is shown. The wind profile 41 provides the wind direction 42 and the wind speed 43 with no corrections for systematic Doppler errors applied. The standard deviation of each range segment is shown as a bar parallel to axis 47. Here, the standard deviation bars show the amount of variation or dispersion in wind direction and speed through the lower atmosphere. The wind direction below 50 m with standard deviation 44 shows significant variability as indicated by the length of the standard deviation bars. The wind speed 43 below 50 m with standard deviation 46 also shows significant variability as indicated by the relative length of the standard deviation bars. The variability gradually increases up column 45.

In one or more embodiments, a first step in correcting systematic Doppler errors in measurements used to obtain the wind speed and direction in SODAR systems is to remove the SODAR measured wind speed at ground level (usually between approximately 0 m and 15 m) from the entire measured wind speed profile. The SODAR measured wind speed at ground level can be subtracted from the wind speed profile using known DSP techniques.

Preferably, this subtraction is achieved by subtraction of the scalar wind speed at 10 m, but may also be achieved by vector subtraction. As will be appreciated by those skilled in the art, wind is described as having both a direction and a speed (magnitude) and therefore is ordinarily a vector quantity. Although the wind is a vector quantity, the wind direction and speed can be treated separately as scalar values as shown by 42 and 43. SODAR systems inherently measure the wind using vector averages. That is, they measure the wind components and then combine the component measurements to form a wind vector at selected averaging intervals. Unlike anemometers and wind vanes, SODAR systems typically do not measure the wind speed and wind direction independently.

As will be appreciated, if there is no direction wind shear then the subtraction can be a simple subtraction up column 45, for example. If there is any wind direction shear then the subtraction is preferably performed by vector subtraction.

After the subtraction of the SODAR measured wind speed at ground level a derived wind speed profile that has the systematic wind speed error at ground level removed is provided. However, the systematic errors to a height of $D_e$ remain in the derived wind speed profile. These errors can be propagated to greater heights as the wind speed profile is generally obtained by upwards addition of the Doppler shift in each height segment e.g., adding together the outputs from a plurality of height segments up to 300 m to generate an incremental or cumulative phase from the ground up.

Figure 5:
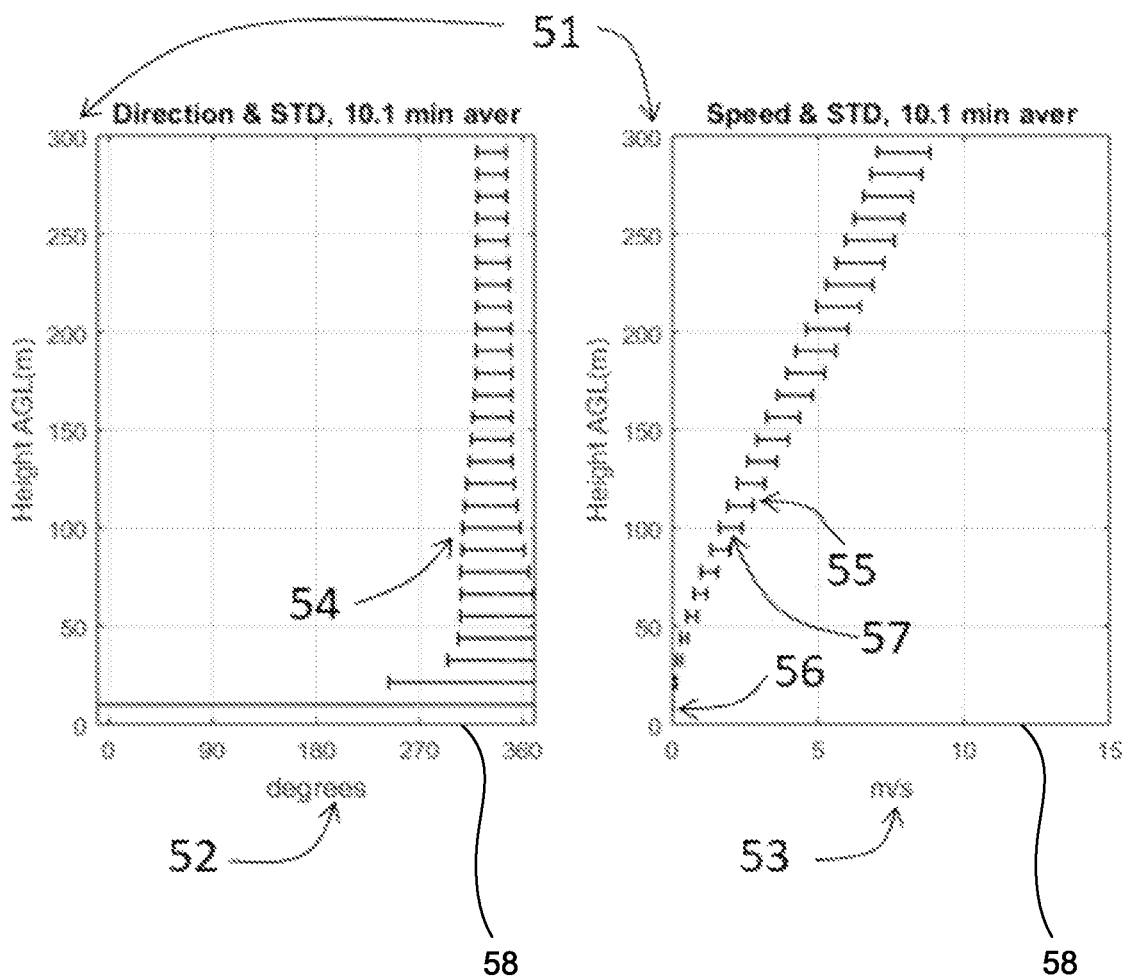
FIG. 5 shows an exemplary Doppler measured wind speed profile with a subtracted ground wind speed.

FIG. 5 shows the exemplary Doppler measured wind speed profile of FIG. 4 with a subtracted ground wind speed.

Referring to FIG. 5, a wind profile 51 up to a height of 300 m from a pulse compressions SODAR system is shown with a subtracted ground wind speed 52. The wind profile 51 provides the wind direction 52 and the wind speed 53. The standard deviation of each range segment is shown as a bar parallel to axis 58. As above, the standard deviation bars show the amount of variation or dispersion in wind direction through the lower atmosphere. The wind direction below 50 m with standard deviation 54 shows significant variability as indicated by the length of the standard deviation bars. However, the wind speed 53 at ground level is now 0 m/s. The variability gradually increases up column as shown by 55 and 57.

Figure 6:
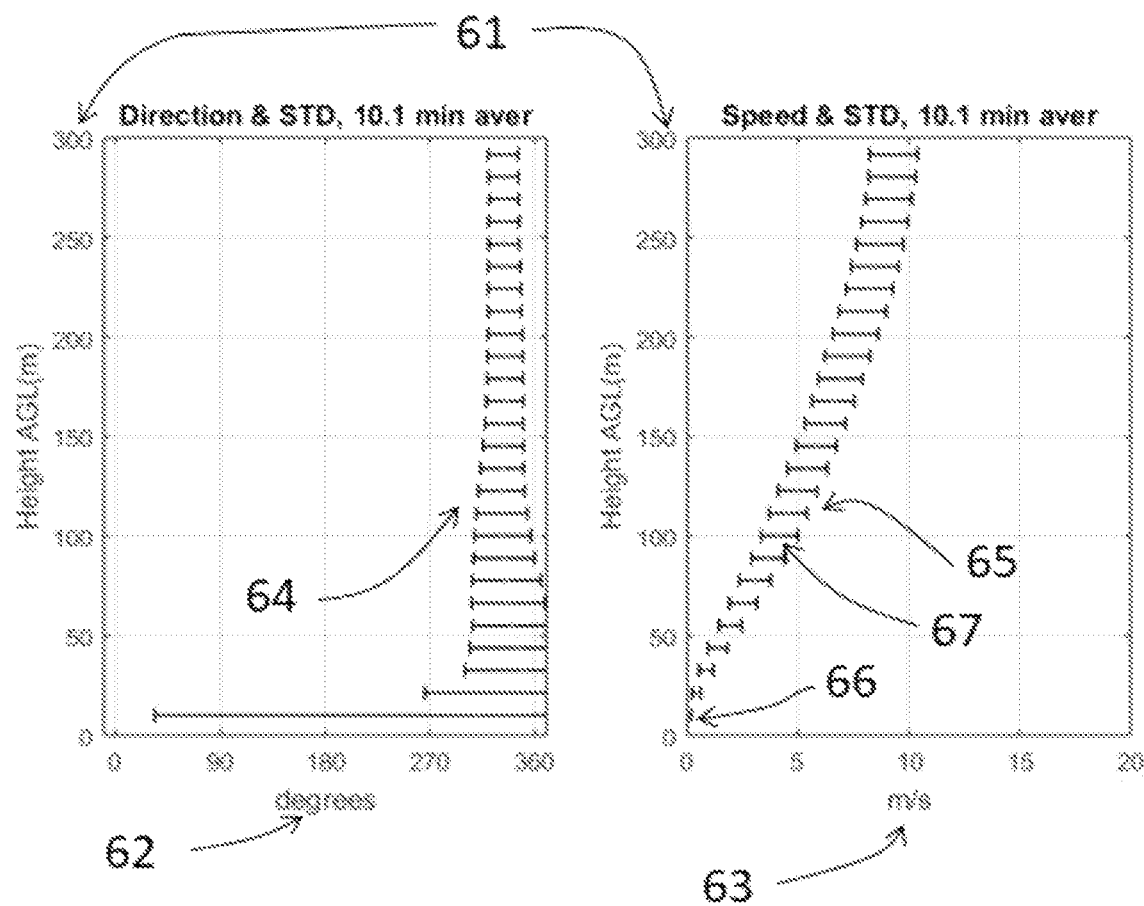
FIG. 6 shows an exemplary derived wind speed profile after error corrections are made according to an embodiment of the invention.

FIG. 6 shows the exemplary Doppler measured wind speed profile of FIG. 5 after error corrections are made according to an embodiment of the invention.

Referring to FIG. 6, a wind profile 61 up to a height of 300 m from a pulse compressions SODAR system is shown with a subtracted ground wind speed and an application of a correction factor to the wind shear profile 61 to provide a corrected wind shear profile at a plurality of height segments. The wind profile 61 provides the wind direction 62 and the wind speed 63. The standard deviation of each range segment is shown as a bar parallel to axis 67. The wind speed 66 at ground level is still 0 m/s. The wind speed 68 at 100 m has increased from 2 m/s to 4 m/s after the application of the correction factor when compared with same of FIG. 5.

In one or more embodiments, the correction factor is selected from a look-up table of correction factors associated with the plurality of height segments. At least part of the correction factor may be determined by calibration against an independent reference system such as a tower having calibrated anemometers at various heights, interpolation between the heights may also be required to obtain a more complete wind speed table, for example.

Applying the correction factor selected from a look-up table of correction factors can replace runtime computation of an algorithm with a simpler array indexing operation or the like. For example, a power series function can be substituted by a lookup table. The savings in terms of processing time can be significant, since retrieving a value from memory is often faster than undergoing an "expensive" computation or input and/or output operation (in SODAR applications time is often more critical than memory).

The look-up table may consist of a selection of heights and associated multiplying vales for each height at which to correct the wind speed with interpolation between each correction table value.

In one or more embodiments, the correction factor may be calculated using a correction algorithm. The algorithm may provide a multiplying correction y to be applied at each of the plurality of height segments given by:

$$y = C \times h^a \qquad (1)$$

where h is the height in metres, C is a system dependent constant derived from calibration data (typically in the order of 140) and a is an exponential constant (typically in the order of −0.47). It will be appreciated that higher terms of equation (1) may also be used.

Typical multiplying correction y values are up to 1.3 times, indicating an overall error of approximately 30% that needs to be corrected.

Figure 7:
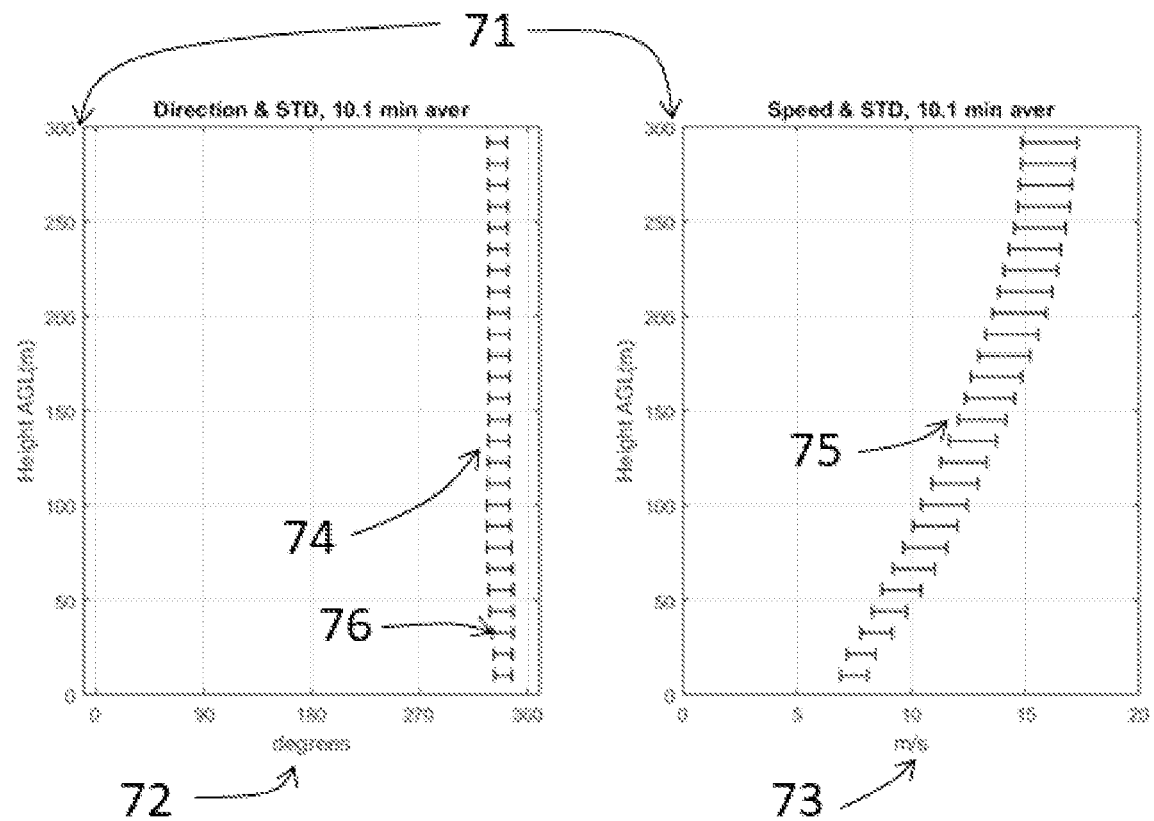
FIG. 7 shows an exemplary derived wind speed profile after a ground wind speed is added according to an embodiment of the invention.

FIG. 7 shows the exemplary derived wind speed profile of FIG. 6 after a ground wind speed is added according to an embodiment of the invention.

Referring to FIG. 7, a wind profile 71 up to a height of 300 m from a pulse compressions SODAR system is shown with a subtracted ground wind speed and an application of the correction factor (as described above) to the wind shear profile 71. The wind profile 71 further includes the addition of a ground wind speed measured by an anemometer at 10 m to provide a corrected wind shear profile at a plurality of height segments. The wind profile 71 provides the wind direction 72 and the wind speed 73. The anemometer measured wind speed at ground level can be added to the wind speed profile using known DSP techniques using scalar addition but preferably vector addition to ensure that any wind direction shear in the column is correctly accounted for.

In one or more embodiments, wind speed is measured by an anemometer at 10 m. Such a measurement can be made by using a guyed tower or the like. A cup anemometer and wind vane, or a vane with a propeller speed sensor mounted in front may also be employed. The primary quantity required is the average wind speed. A representative value may be obtained from values taken every few seconds.

As above, the standard deviation bars show the amount of variation or dispersion in wind direction through the lower atmosphere. The wind speed and direction near the ground (for example, below 50 m) with standard deviation 76 shows significantly less variability as indicated by the length of the standard deviation bars and hence more accurate wind direction and speed measurements.

Figure 8:
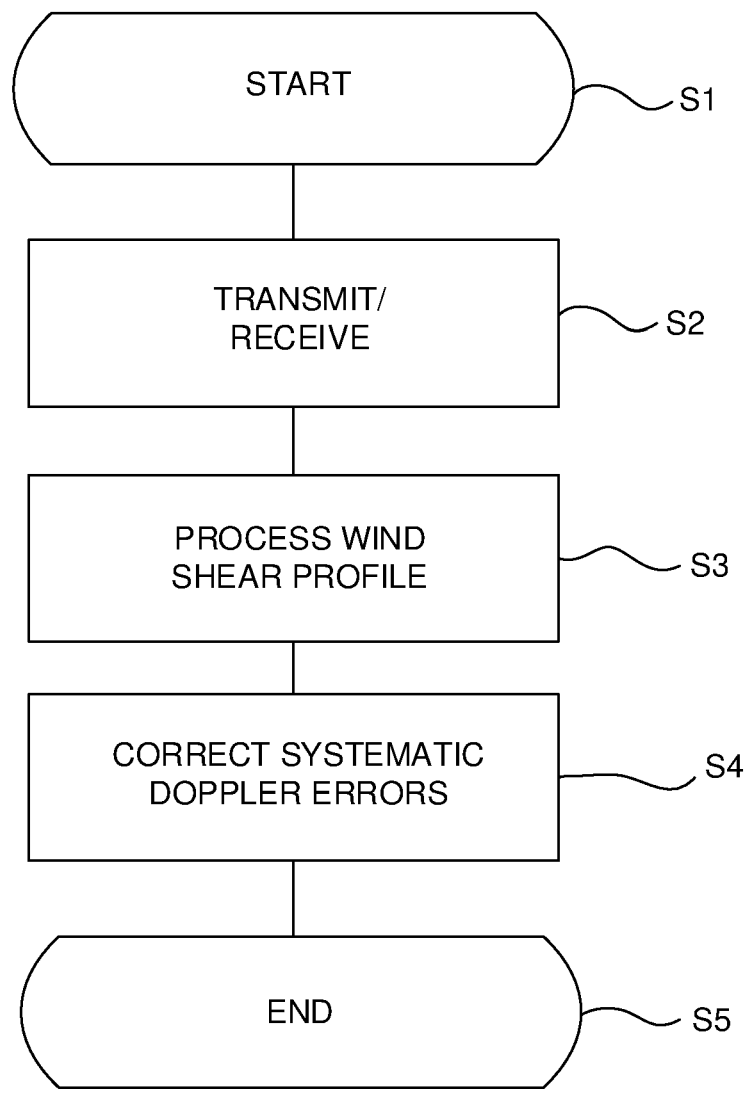
FIG. 8 is a flowchart of a control process of an exemplary embodiment of the invention.

Referring to FIG. 8, there is shown a flowchart illustrating a method of improving performance of a SODAR system. The method begins at start block 51 and proceeds to block S2 where one or more acoustic chirps are transmitted and the echoes of the transmitted chirps are received by the SODAR system. At block S3 the echoes of the transmitted chirps are processed to provide an indication of discontinuities in the atmosphere, thereby providing a wind shear profile. The wind shear profile generally provides an indication of wind speed and wind direction at a plurality of range segments. At block S4 the wind shear profile is corrected for systematic Doppler errors associated with the acoustic echoes by subtracting a SODAR measured wind speed from the wind shear profile by vector subtraction and then adding an anemometer measured wind speed to the wind shear profile by vector addition. The method terminates at block S6.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The invention claimed is:

1. A method of improving performance of a SODAR system adapted to locate discontinuities in the atmosphere by transmitting pulse compression signals such as a plurality of acoustic chirps, the method comprising:
    transmitting one or more acoustic chirps;
    receiving one or more acoustic echoes of the transmitted chirps;
    processing the acoustic echoes to provide an indication of the discontinuities in the atmosphere, thereby providing a wind shear profile;
    processing the wind shear profile to correct systematic Doppler errors associated with the acoustic echoes by:
        subtracting a first measured wind speed from the wind shear profile; and
        adding a second measured wind speed to the wind shear profile;
        wherein the second measured wind speed is measured by an anemometer.

2. A method according to claim 1, wherein the first measured wind speed is measured by the SODAR system.

3. A method according to claim 1, wherein the first measured wind speed and second measured wind speed are taken at ground level.

4. A method according to claim 1, wherein the first measured wind speed and second measured wind speed are taken at between 0 m and 15 m above ground level.

5. A method according to claim 1, wherein the first measured wind speed is a scalar wind speed.

6. A method according to claim 1, wherein the first measured wind speed is a vector wind speed.

7. A method according to claim 1, wherein the second measured wind speed is a scalar wind speed.

8. A method according to claim 1, wherein the second measured wind speed is a vector wind speed.

9. A method according to claim 1, wherein processing the wind shear profile to correct systematic Doppler errors further comprises application of a correction factor to the wind shear profile to provide a corrected wind shear profile at a plurality of height segments.

10. A method according to claim 9, wherein the correction factor is selected from a look-up table of correction factors associated with the plurality of height segments.

11. A method according to claim 9, wherein the correction factor is calculated using a correction algorithm.

12. A method according to claim 11,
    wherein the algorithm provides a multiplying correction y to be applied at each of the plurality of height segments given by:

$$y = C \times h^a$$

where h is the height in metres, C is a system dependent constant derived from calibration data and a is an exponential constant.

13. A method of improving performance of a SODAR system adapted to locate discontinuities in the atmosphere by transmitting pulse compression signals such as a plurality of acoustic chirps, the method comprising:
    transmitting one or more acoustic chirps;
    receiving one or more acoustic echoes of the transmitted chirps;
    processing the acoustic echoes to provide an indication of the discontinuities in the atmosphere, thereby providing a wind shear profile;
    processing the wind shear profile to correct systematic Doppler errors associated with the acoustic echoes by:
        subtracting a first measured wind speed from the wind shear profile; and
        adding a second measured wind speed to the wind shear profile;
    wherein processing the wind shear profile to correct systematic Doppler errors further comprises application of a correction factor to the wind shear profile to provide a corrected wind shear profile at a plurality of height segments;
    wherein the correction factor is calculated using a correction algorithm; and
    wherein the algorithm provides a multiplying correction y to be applied at each of the plurality of height segments given by:

$$y = C \times h^a$$

where h is the height in metres, C is a system dependent constant derived from calibration data and a is an exponential constant.

* * * * *